United States Patent
Hanson (10) Patent No.: US 12,509,862 B2
(45) Date of Patent: Dec. 30, 2025

(54) HANSON DEEP BORE WATER PRODUCTION SYSTEM FOR MOUNTAINOUS COASTAL ENVIRONMENTS

(71) Applicant: Matthew Vernon Hanson, Cambridge, MA (US)

(72) Inventor: Matthew Vernon Hanson, Cambridge, MA (US)

( * ) Notice: Subject to any disclaimer, the term of this patent is extended or adjusted under 35 U.S.C. 154(b) by 153 days.

(21) Appl. No.: 18/232,667

(22) Filed: Aug. 10, 2023

(65) Prior Publication Data

US 2025/0052041 A1 Feb. 13, 2025

(51) Int. Cl.
*E03B 3/28* (2006.01)
*F24F 5/00* (2006.01)

(52) U.S. Cl.
CPC .............. *E03B 3/28* (2013.01); *F24F 5/0046* (2013.01); *F24F 2005/0057* (2013.01); *F25B 2313/002* (2013.01)

(58) Field of Classification Search
CPC ...... E03B 3/28; F25B 30/06; F25B 2313/002; F24F 5/0046
See application file for complete search history.

(56) References Cited

U.S. PATENT DOCUMENTS

| | | | |
|---|---|---|---|
| 1,061,206 A | 5/1913 | Tesla | |
| 2008/0303282 A1* | 12/2008 | Ziegenfuss | ........... F03B 17/005 290/52 |
| 2017/0101764 A1* | 4/2017 | Vaughen | ................. F28D 1/022 |
| 2021/0300788 A1* | 9/2021 | Wetzker | ................. C02F 1/043 |

OTHER PUBLICATIONS

Climo, Melissa, Lisa Lind, Brian Carey, and Simon Bendall. The Rise and Rise of Geothermal Heat Pumps in New Zealand. Proceedings of the New Zealand Geothermal Workshop 2012, Nov. 19-21, 2012, Auckland, New Zealand.

Grainger. Ingersoll Rand Rotary Screw Air Compressor, Tankless, 40 hp, 575 V AC, Three Phase (Item 53RU39, Model RS30i A118 TAS/575). Product page. Available at: https://www.grainger.com/product/INGERSOLL-RAND-Rotary-Screw-Air-Compressor-53RU39 (accessed Jun. 10, 2025).

Gyroscope.com. Tesla Turbine—MK4. Product page. Available at: https://www.gyroscope.com/d.asp?product=TESLATURBINE4 (accessed Jun. 10, 2025).

(Continued)

*Primary Examiner* — Joseph F Trpisovsky (57) ABSTRACT

Mountainous coastal regions with consistent high humidity and consistent temperatures provide an opportunity to farm the atmosphere for water. The present invention, utilizing simple tools such as a compressor, a length of copper tubing, and a Tesla turbine takes advantage of geothermal cooling and gravity to power the major parts of the invention. In the invention compressed humid air is sent along a tube buried four feet underground where the ambient temperature is 55 degrees Fahrenheit. The tube is canted at a 45-degree angle along the slope of a hill or mountainside and gravity pulls the water from the walls and as it accumulates, accelerates the water, and as the water it exits the Tesla turbine at the far end of the tube it generates electricity which can be used to partially power the compressor.

3 Claims, 5 Drawing Sheets

(56) References Cited

OTHER PUBLICATIONS

HyperPhysics, Department of Physics and Astronomy, Georgia State University, "Water Vapor Pressure and Related Concepts," http://hyperphysics.phy-astr.gsu.edu/hbase/Kinetic/watvap.html#c1 (accessed Jun. 6, 2025).

Sabin Civil Engineering. Tesla Turbine | The interesting physics behind it. YouTube, Jun. 3, 2021. https://www.youtube.com/watch?v=AfCyzlbpLN4 (accessed Jun. 6, 2025).

The Home Depot. Cerro 1 in.×10 ft. Copper Type L Hard Temper Straight Pipe. Product page. Available at: https://www.homedepot.com/p/Cerro-1-in-x-10-ft-Copper-Type-L-Hard-Temper-Straight-Pipe-1-L-10/100354226 (accessed Jun. 6, 2025).

Weather and Climate. Average Monthly Humidity in San Francisco (CA), United States of America. Available at: https://weather-and-climate.com/average-monthly-Humidity-perc,San-Francisco,United-States-of-America (accessed Jun. 6, 2025).

\* cited by examiner

HANSON DEEP BORE WATER PRODUCTION SYSTEM FOR MOUNTAINOUS COASTAL ENVIRONMENTS

BACKGROUND OF THE INVENTION

The present invention seeks to utilize high humidity coastal mountainous areas for the production of water. The invention utilizes several past, present, and emerging technologies, but at the core, the invention consists of a compressor, a small-bore copper pipe, and a Tesla turbine.

BRIEF SUMMARY OF THE INVENTION

This invention brings together several technologies to create a working whole. The primary technology is the principle behind geothermal heat pumps, which rely on subsurface ambient temperatures (See FIG. 1) but it is the combination of the concepts behind heat pumps, condensation, gravity, and the peculiarities of the Tesla turbine which make the entire invention possible.

BRIEF DESCRIPTION OF THE DRAWINGS

FIG. 5 is a "building by building" version per claim 3 wherein a solar panel at Item 51 partially powers a compressor at Item 52 wherein moist air is compressed and sent down copper tubing at Item 53 which is wound around structural members at Item 54, or embedded in insulation at Item 57, or in masonry at Item 58. The compressed air travels the copper tubing releasing water vapor via condensation and where the condensed water and compressed air passes through a Tesla turbine at Item 55, and where electricity from the Tesla turbine travels via a wire at Item 56 to partially power the compressor and water is sent via a pipe from the Tesla turbine to a floor drain at Item 59 to sewage treatment and/or water reclamation at Item 61, or directed to potable water/filtration at Item 60 or via a separate water line at Item 62 leading to fire suppression sprinklers at Item 63.

DETAILED DESCRIPTION OF THE INVENTION

We are all familiar with air conditioners. It essentially consists of two types of radiators. One which radiates heat outward into the surrounding air, and another which radiates cooling air in towards the home.

Figure 1:
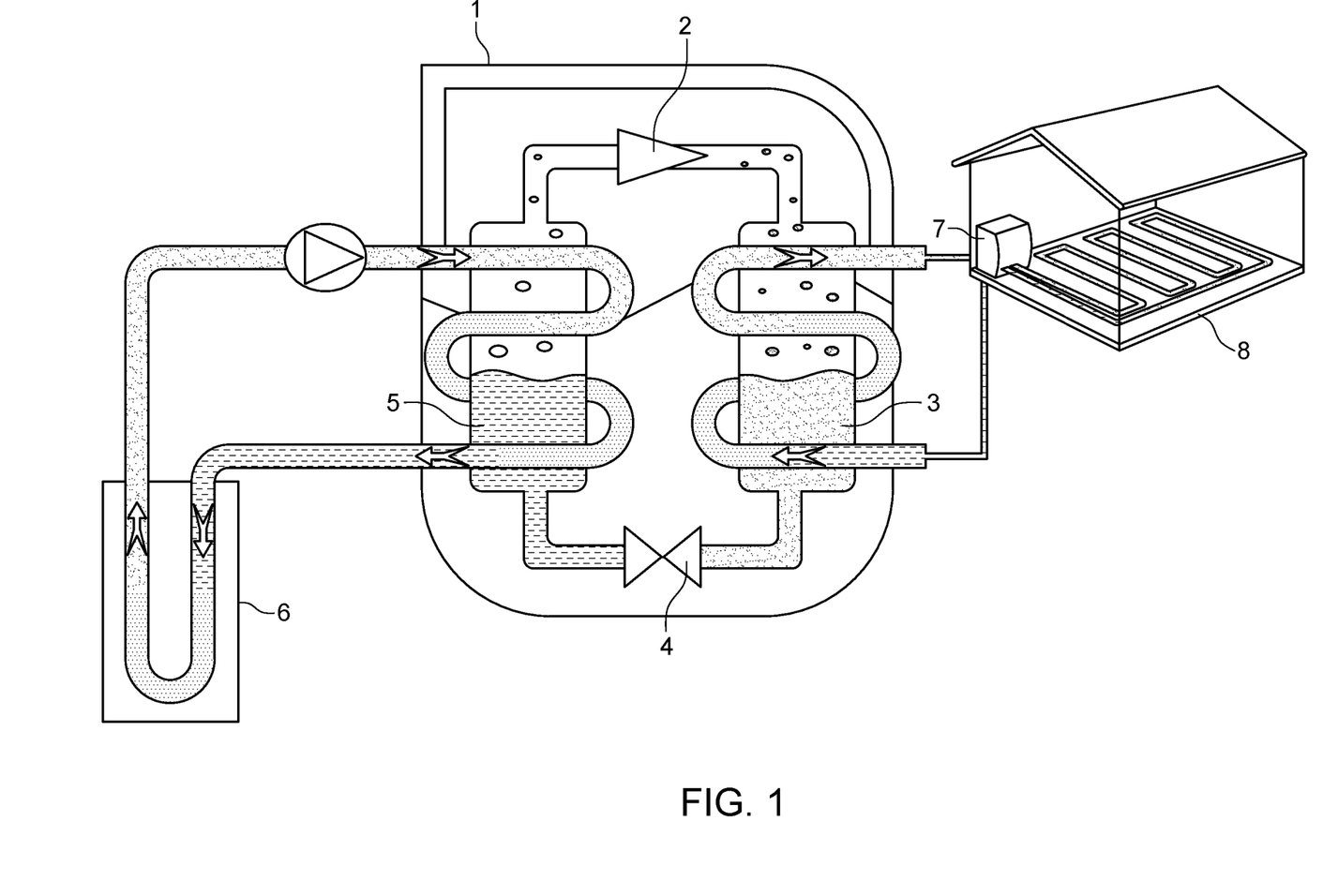
FIG. 1 is a geothermal heat pump application for heating and cooling a house wherein Item 1 is a heat pump increasing the pressure and raising the vapor temperature, Item 2 is a compressor, Item 3 is a condenser, Item 4 is an expansion valve where the working fluid expands causing it to cool, Item 5 is the evaporator, Item 6 is the ground loop which is a network of pipes buried in the ground or immersed in a water source and the ground loop transfers heat to a working fluid in the heat pump, Item 7 is an additional heat pump where heat is transferred to the building's distribution system, and Item 8 is the distribution system itself which can be either underfloor heating, radiators, or a forced-air system.
Figure 2:
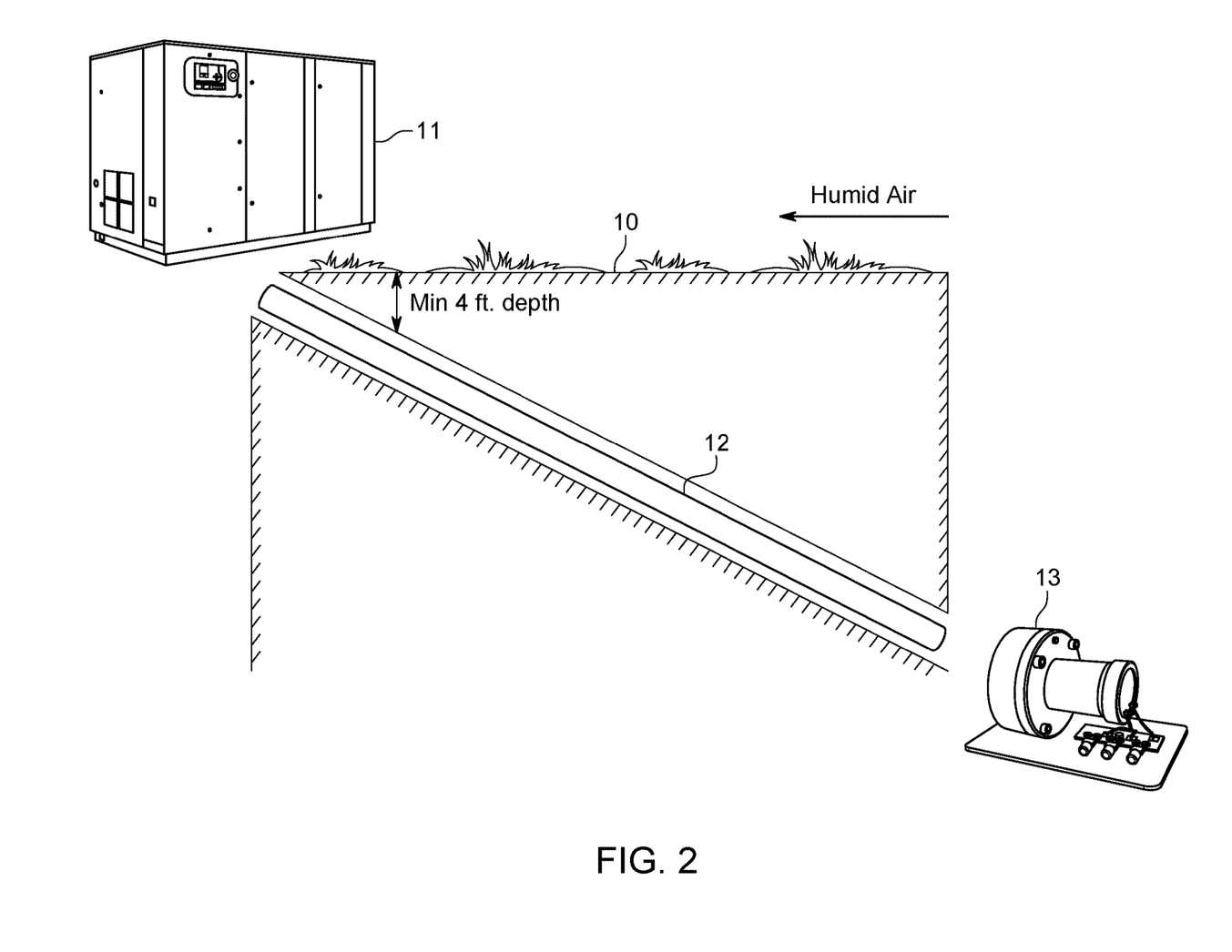
FIG. 2 is a side-view diagram of the system wherein Item 10 is ground level, Item 11 is an industrial air compressor, Item 12 is copper pipe, Item 13 is a Tesla turbine.

Similarly, in a geothermal heat pump, as seen in FIG. 1, depending on the season, a water/antifreeze mix is pumped from the home underground where ambient temperatures are generally 55 degrees Fahrenheit. In warmer weather heat is transferred away from the home to the underground system; and in cooler weather heat is transferred from the ground into the home.

In considering the problems California currently has in regard to fresh water supply, full advantage has not been taken of the "ocean of air" which moves ashore on a continual basis. Air which has spent weeks flowing over the Pacific Ocean. It is "wet" air. In San Francisco that air has an annual average humidity of 75%.

While there are several inventions which extract humidity from that air, it occurred to this inventor that industrial-scale extraction of that moisture might solve many of California's ongoing water problems.

There is a bit of math involved in figuring out the best way to do that on a larger scale, but for the purposes of this discussion, it is worthwhile to kind of think of the air above most of California as a giant sponge which is 75% saturated with water. And in order to get that water out of the air, all you have to do is find a way to squeeze.

To give you a sense of the amount of water above the city of San Francisco (not counting Silicon Valley and the surrounding areas, just the city itself) we can do a little math.

San Francisco has a land mass of 121.48 square kilometers or 121,480,000 square meters. And the air mass above that land mass has an average humidity of 75%.[1]

[1] https://weather-and-climate.com/average-monthly-Humidity-perc, San-Francisco, United-States-of-America So if you take the first 100 meters, straight up, you get a column of air consisting of 12,148,000,000 cubic meters.

Each cubic meter at 20 degrees Celsius at 75% humidity holds (17.3×0.75 or) about 13 grams of water. So above San Francisco during an average day, you have 157,924,000,000 grams or 41,723,645 gallons of water floating in that first 100 meters above your head (1 gallon of water=3785 grams).

The amount of water in the air increases or decreases with temperature (the air can't hold at much at night as temperatures drop), but 41 million gallons of water is a kind of interesting number to consider. Particularly since that air is continually replenished on a minute-to-minute basis by prevailing winds moving eastward from the Pacific Ocean.

In other words, you have a giant 41,723,645 gallon faucet sitting right above your head. That number is actually much higher—as that column of air retaining that 75% humidity extends quite a bit farther up. Since thunderclouds typically extend from 0.6 to 0.9 km, for our working discussion we can round that up to 1 kilometer. That leads to a renewable "air faucet" above San Francisco equal to ten times the 41 million gallons or 417,236,459. Four hundred seventeen million gallons.

In the nine county San Francisco Bay area which comprises 18,040 square kilometers (a factor of 18040/121.48=148) that means that everyone living in the nine-county SF area has about 61,750,995,932 gallons (61.7 billion gallons) of water sitting right above their heads more or less all the time. Yes. Really. And again, that amount is replenished on a day-to-day and minute-by-minute basis by winds from the Pacific Ocean. Which means California doesn't really have a water problem. Humanity has a lack of ingenuity problem.

This 61.7-billion-gallon figure is somewhat interesting as the daily usage of water for the City of San Francisco is currently averaging 42 gallons per person for a population of 2.7 million. Or a daily water usage amount of 42×2,700,000 or 113,400,000 gallons.

Or another way to look at it is, the air just over San Francisco and Silicon Valley could meet the daily water needs of San Francisco 544 times over, and the needs of the entire state of California (38 billion gallons per day) 1.62 times over.

Currently San Francisco residents pay $0.0123/gallon for water, and also pay $0.0149/gallon for the wastewater they produce. For a grand total of $0.0272/gallon. Which means the column of air over San Francisco and Silicon Valley (61.7 billion gallons) has a monetary value of $1.67 billion. More or less. And you basically can never exhaust it.

In more practical terms, any solution to extract that water from the giant "sponge of air" above San Francisco has to have a "meet or beat" price of less than $0.0272/gallon.

It is generally not practical to extract humidity from the air in an urban environment. You can put up humidity nets and so on, but the bustle of commerce, the movement of people, and the realities of transportation, building construction, and so on, do not really allow for the kinds of all-inclusive solutions required to farm those 61.7 billion gallons of water sitting above San Francisco residents' heads at any given time.

So in order to "farm the air" or "squeeze the sponge" we must range a bit farther afield. Specifically, to the areas like those surrounding the San Leandro Reservoir. Though in reality any mountainous area close to the coastline that has a sufficient downslope at a sufficiently steep angle will do.

In the area of the San Leandro Reservoir, you still benefit from the same high humidity, but also have a bit of elevation you can play with, and it is that elevation which is a key part of this invention.

While it will take a bit of time and experimentation to iron out the ideal diameter of copper pipe to use, the ideal length of that pipe, as well as the dynamic energy recoupment features of the system from the Tesla turbine, utilizing the downslope of the terrain to drill a bore at an approximately 45 degree angle, at a minimum 4 feet of depth, sheathing that bore in copper pipe, and utilizing a compressor at the top end and a Tesla turbine (U.S. Pat. No. 1,061,206A) at the bottom end to recoup energy should allow for an economical solution brining the cost per gallon below the San Francisco numbers.

But in order to do this let's run some possible scenarios using known equipment.

In the first iteration, let's use copper pipe you could pick up at any Home Depot. For ease of use, let's use the 1-inch diameter pipe referenced in the footnote. It is rated at 850 psi with operating temperatures up to 150 degrees Fahrenheit.[2] It comes in 10 feet lengths, so let's buy 1000 feet worth which will cost us $6721.00 plus tax.

[2] https://www.homedepot.com/p/Cerro-1-in-x-10-ft-Copper-Type-L-Hard-Temper-Straight-Pipe-1-L-10/100354226

The formula for the internal surface area of the pipe (the lateral area) once we solder it all together into a single tube is $(2*\pi*r)*h$. That equals 37,699.11 square inches or 261.79 square feet of surface area.

For the air compressor, let's use the Ingersoll-Rand RS30I-A118 TAS/575 which will run us $33,226.29 and which is a continuous industrial-scale air compressor which can run at 118 psi and run 184 cubic feet (5.2 cubic meters) per minute (or 5.2*60*24 or 7,488 cubic meters per day) through the pipe.

Going back to our San Francisco example, in each cubic meter of air, there are approximately 13 grams of water. Meaning at 7,488×13 grams the system is producing 97,344 grams (or 25 gallons) per day. And it actually won't be that much because the ambient temperature underground is only 55 degrees, so the number of gallons you're getting out of the air is only what will condense on the walls of the copper tube due to that 20-degree difference in temperature. And you will also lose some water at the exit as excess air pressure mixes with water and that air exits the turbine taking some of the water with it.

What's interesting from a power-management standpoint is that due to the high level of pressure going through the pipe, that pressure is spinning the Tesla turbine. And one of the interesting peculiarities of the Tesla turbine is that it can use either air or water. The turbine generates electricity. And that electricity, via a wire, heads back up hill with no gravity penalty, and can help to power the compressor.

So on the surface, this looks to be a failed experiment. You've spent a lot of money on copper pipe and have bought an expensive air compressor. And you're only getting 25 gallons of water per day. But each of those gallons is "free" in the sense that the only input is air (which is free); and as long as the compressor and Tesla turbine act in concert, you can keep on producing those 25 gallons of water for years at a relatively minimal cost.

Now let's say that instead of one line of copper tubing, we laid 100 parallel lines. And we figured out the optimal number of compressors to buy to maximize the output from the system. You instantly go from 25 gallons to 2500 gallons per day. Which is enough for 60 San Francisco residents. All of whom would be willing to pay you $0.0274 cents per gallon. Meaning the system technically made $68.50. Per day. Meaning the annual revenue stream from that is $25,002.50. The cost of the additional copper pipe for those 100 lines? $672,100. So that still looks like a failed experiment. At $25,002.50 per year in income it will take you 22.8 years to pay off the piping alone.

But let's say you put $100 million into a system like this instead. And assume that if you start buying copper piping in bulk you no longer need to pay retail prices at Home Depot. You can buy your piping direct from a factory so you can get the price down to maybe $2000 per line. That means for your $100 million could set up 50,000 lines more or less, each producing 25 gallons a day. Meaning you could produce 1,250,000 gallons. Per day.

Or 456,250,000 gallons per year.

Drop a billion into it, and your output is 4.5 billion gallons per year, more or less.

So the real power of this invention is—you can scale it for minimal cost. Between the gravity assist giving you back some of your electricity spend, and the geothermal cooling creating a "free condenser" all for the cost of burying a pipe, you get a lot of savings. Which means your water gets closer and closer to being like rain—i.e. free.

In a truly industrial application, you build large scale compressors, and combine the outputs of the pipes into larger-scale industrial hydroelectric turbines instead of having a Tesla turbine at the end of each pipe.

In such a scenario, you get the gravitational advantage of the downslope, and if you combine the different lines at an optimal distance from the turbine, you might actually be able to achieve what is essentially hydro power from the system— which, depending on the efficiencies you build into it, might result in getting more power out of the system than you put into it via the gravity assist-meaning the water output from the system actually would be essentially a by-product of electrical generation and therefore completely free.

The final step in all of this is imagining this system built into every mountainous hillside from San Diego to Seattle. Basically, anywhere there is high humidity coming off the Pacific Ocean; anywhere you can run a copper pipe deep enough, and at a steep enough angle, to benefit both from the ambient air humidity and the 'gravity assist' given to the water as it condenses in the pipe.

Imagine a system with 100 million 1000 foot copper pipes embedded in hillsides all up and down the West Coast. All pulling water from the humid air. Humid air, which, for as long as the Pacific Ocean exists, will never run out.

100,000,000 pipes producing 25 gallons of water per day is 912,500,000,000 gallons per year. Nine hundred and twelve billion gallons.

If we use the San Francisco standard of 42 gallons a day per person, that is enough water for 59,640,522 people; one fifth of the US population. Just extracted from the air.

Figure 3:
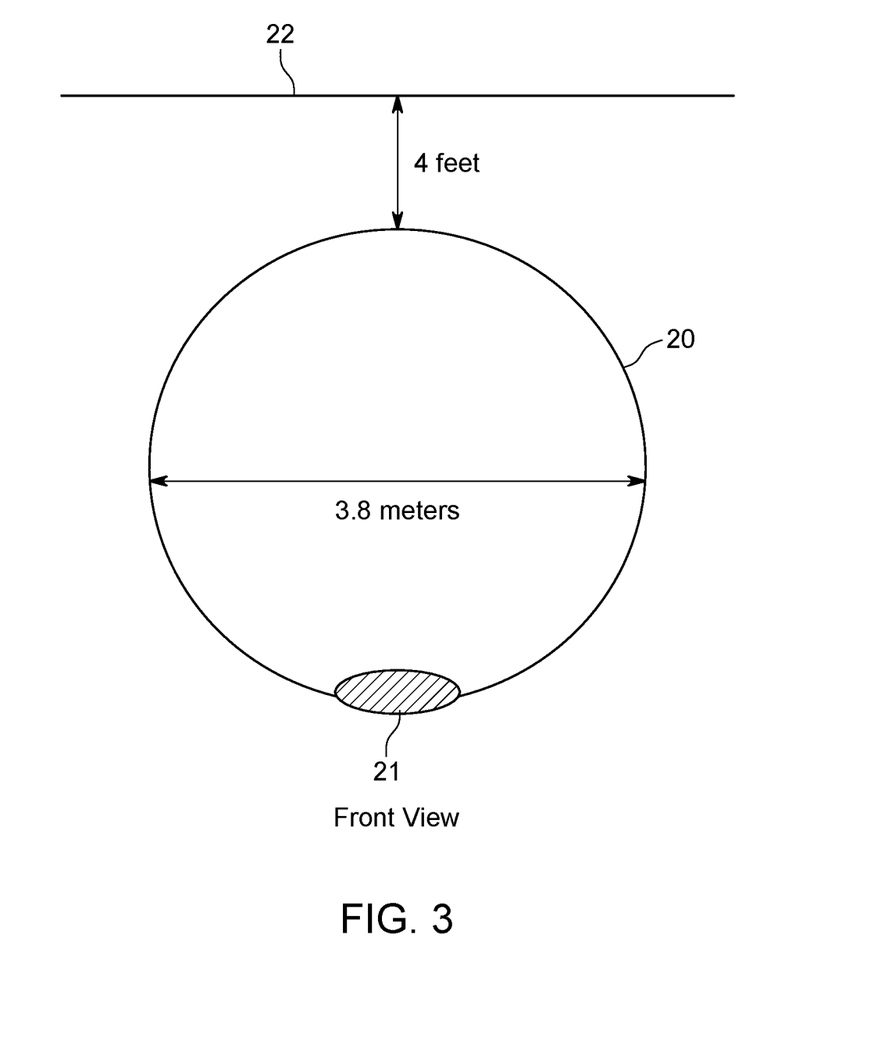
FIG. 3 is a cross section of a "large bore" iteration of the invention, wherein Item 20 is the circumference of the tunnel lined with copper sheeting, Item 21 is a water collection channel, Item 22 is the surface with the entirety of the invention at a depth greater than 4 feet and with a slight incline downward to collect water at the far end as can be seen in FIG. 4.
Figure 4:
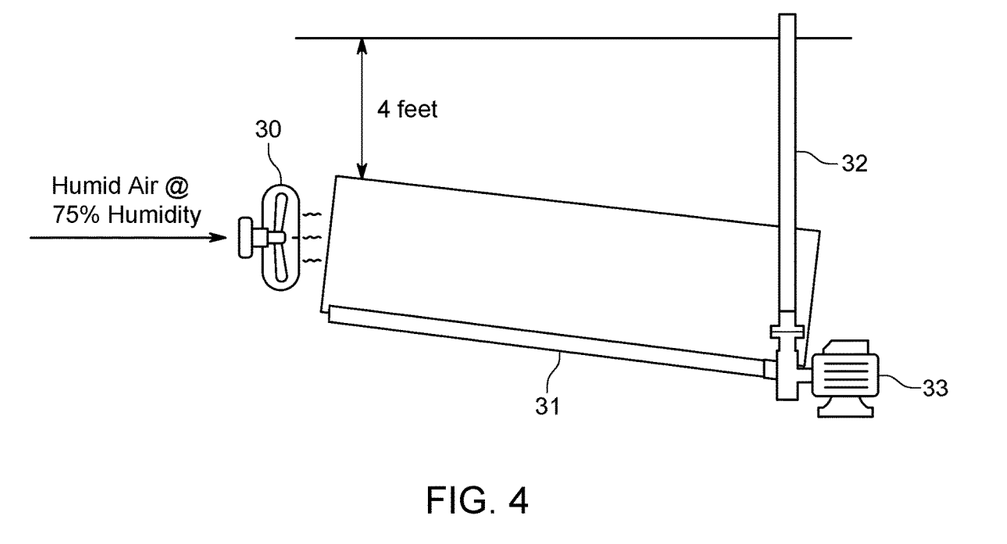
FIG. 4 is a side view of FIG. 3, wherein Item 30 is an industrial fan pushing air through the bore, Item 31 is a channel for water collection leading to Item 32 which is a pipe which would lead to the surface for water collection and include a pump at Item 33.

There are other iterations of this invention which could include larger-bore pipe systems without a gravity assist. For example, a Boring Company, 3.8 meter diameter tunnel sheathed in copper that ran for 1 kilometer would have an internal surface area of 11,938.052 square meters.

A series of large fans at one end could be used to blow humid air down the tunnel. The air would condense on the large surface area of the copper. A channel could be cut in the lower portion of the tunnel to capture the water. If the tunnel had a slight slope, the water would run towards a distant pumping station. While this version would lose the power generation "gravity assist" capabilities of the first (and more efficient) iteration herein described, it would still be a viable humidity-capture "air farming" system to produce water, even though it would have a greater cost per gallon.

Figure 5:
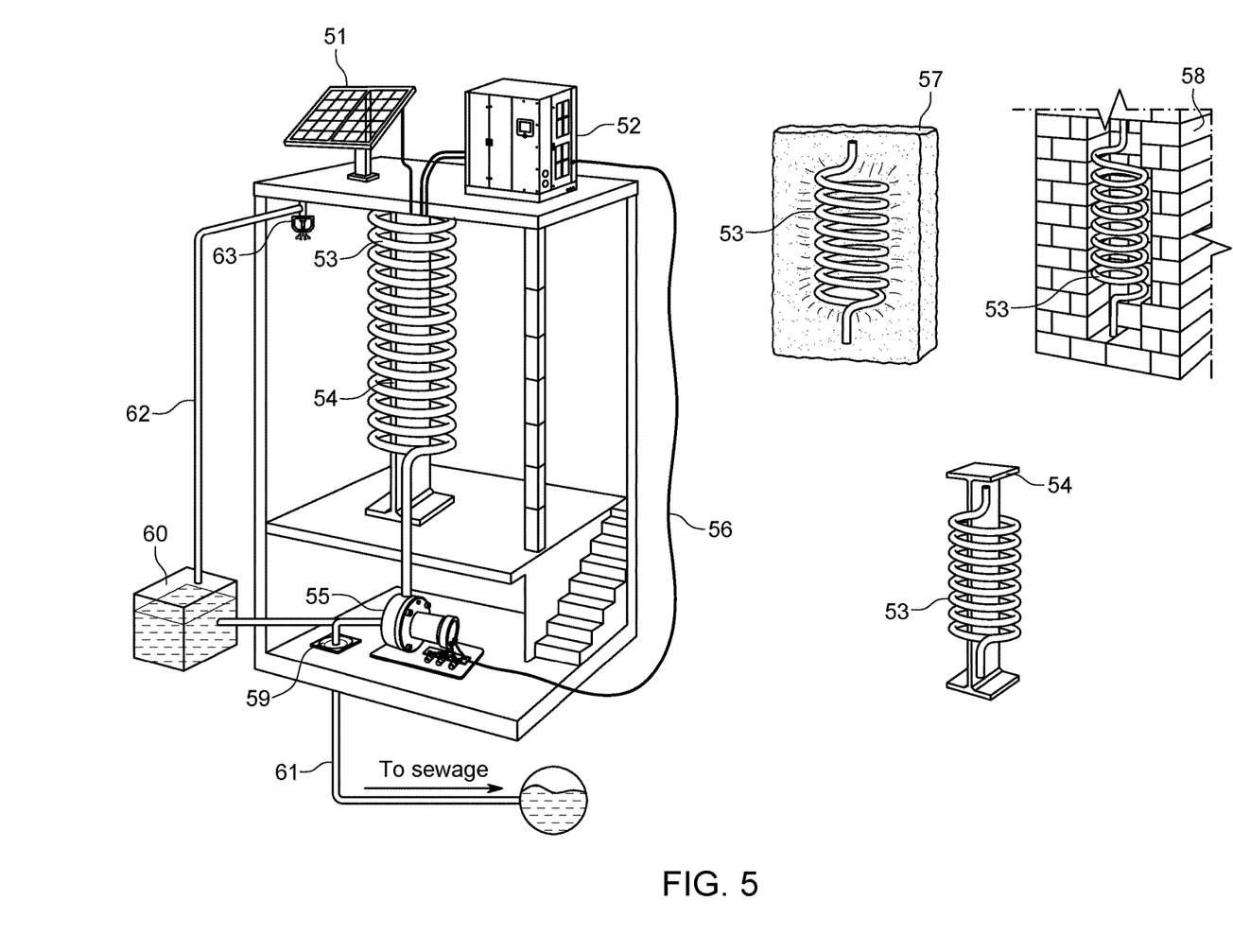

In a third iteration, a "building by building" version, solar panels could be used for a power source for a small compressor at the top of a building. Copper tubing could be run within the central structure of the building winding around generally cooler metal support beams, inside masonry, and embedded inside insulation in a "distillery" coiled configuration. A small Tesla turbine could be used at the bottom of the system to recoup energy from the collected water and/or air pressure, and that electricity could either fed back into the grid or sent back up to the compressor via wire.

As the water from such a system is essentially "distilled" water it could be fed back into a building's sprinkler systems, potable water systems (with appropriate filtration), or just dumped back into the sewer system for later reclamation at sewage treatment plants. With 140 million homes in the US, each running a 25 gallon per day system (one compressor, one copper tube, one Tesla turbine), you would get another (25*140,000,000) or 3.5 billion gallons per day. Or 1,277,500,000,000 gallons per year. Yes that really is 1.27 trillion. Gallons. Per. Year.

Granted, not all of those homes would produce 25 gallons, particularly in drier areas. But for the cost of a small air compressor, which maybe would run a few hundred dollars, a couple of thousand in copper piping, and a small Tesla turbine, each house could become a small-scale water factory. And again, the goal here isn't huge wins, necessarily, just scaling up to the point where you have more water than you know what to do with.

This invention should work in any area where there is high humidity year-round and where topography permits the use of gravity assist for the power reclamation phase. Some ideal locations would be—Coastal California, basically anywhere in the Middle East, the Western Coast of Africa including northern desert countries. Israel. Australia. Eastern China. And basically, anywhere in Japan and the entire east coast of South America.

If we wish to make a paradise of our world—it all begins with water. And the more we have, the more things we can do with it. With enough of it, we can make all of the deserts of the world bloom. And truly turn our Nation into the breadbasket of the world.

It is this inventor's hope that this invention will change the way we think about water. That the invention will help to avoid the wars over the control of water which are almost inevitable as Climate Change accelerates. And perhaps most important of all so that children all over the world can wake up, and open the tap, and always have cool water to drink.

If all of these numbers seem a bit fantastic and impossible, consider the following. The high humidity air mass that from the Pacific Ocean across the entire western coast of the United States creates things like Mammoth's record snowfall in 2016-2017 of 608 inches. Powers most of the rivers in the Pacific Northwest. And if you stand at the banks of the Columbia River, which has a drainage basin the size of France, it has a maximum flow rate of 35,000 cubic meters of water per second.

That mass of humid air from the Pacific powers all of the other major river systems in the Pacific Northwest, creates the annual snowpack in the Rockies, and is responsible for glaciers in Washington, Oregon, California, Montana, Wyoming, Colorado, and Nevada.

That humid air is the lifeblood of agriculture and is responsible for the rain cycle reaching all the way to the Midwest.

In years to come, as Climate Change shifts rain patterns away from traditional expectations, it will become more and more critical for Mankind to "farm the atmosphere" for water in order to provide a reliable source of water even when rain (the traditional way to capture humidity from the air) doesn't cooperate, and higher temperatures create greater amounts of evaporation, making it more difficult for Mankind to keep water on the ground, in rivers, in lakes, and in reservoirs.

Systems like the Hanson Deep Bore Water Production System will be critical to agriculture and to the water security of the Nation for generations to come.

Having herein described my invention I claim:

1. A water production system comprised by an air compressor, a length of narrow gauge copper tubing inclined at a 45 degree angle and buried at least four feet below the surface to take advantage of geothermal cooling and wherein moist air is compressed at the top of the tubing, that compressed air travels the length of the tubing releasing water vapor via condensation and where the incline of the tubing accelerates the condensed water via gravity towards the far end of the tube where it passes through a Tesla turbine which can translate that gravity accelerated water and/or pressurized air into rotational motion which in turn can power an electrical generator the electricity from which is ported back to the air compressor to reduce the energy requirements of the system.

2. An iteration of 1 where a larger bore tunnel is used also at four feet or greater of subsurface depth, canted at an angle, and the inside circumference of the tunnel is coated with copper plating and wherein the compressor in 1 is substituted with an industrial fan or wind-tunnel style turbine which pushes air into the tunnel and as humid air travels down the length of the tunnel water condenses on the walls, flows to a channel on the floor, and at the far end is pumped to the surface.

3. A water production system comprised by an air compressor positioned on top of a house or building, copper tubing is wound around structural members or embedded within masonry or embedded inside insulation to provide lower temperatures and promote condensation in the copper tubing, wherein moist air is compressed at the top of the copper tubing, travels the copper tubing releasing water vapor via condensation and where the condensed water passes through a Tesla turbine in a basement or at the ground level of the building to recapture energy and transmits that energy back to the air compressor to reduce the energy requirements of the system and where the resulting water is sent to potable water systems, filtration, or to a sewage system for later reclamation.

\* \* \* \* \*